(12) United States Patent
Shabat

(10) Patent No.: US 12,490,915 B2
(45) Date of Patent: Dec. 9, 2025

(54) SYSTEMS AND METHODS FOR DETERMINING LUNG IMPEDANCE

(71) Applicant: Yehezkel Harpaz, Ramat Hasharon (IL)

(72) Inventor: Roni Shabat, Kfar Yehezkel (IL)

(73) Assignee: Michael Kleiner Shochat, Matan (IL)

( * ) Notice: Subject to any disclaimer, the term of this patent is extended or adjusted under 35 U.S.C. 154(b) by 891 days.

(21) Appl. No.: 17/731,649

(22) Filed: Apr. 28, 2022

(65) Prior Publication Data

US 2022/0354382 A1    Nov. 10, 2022

(30) Foreign Application Priority Data

Apr. 28, 2021    (IT) .................. 102021000010775

(51) Int. Cl.
| | | |
|---|---|---|
| *A61B 5/085* | (2006.01) | |
| *A61B 5/00* | (2006.01) | |
| *A61B 5/251* | (2021.01) | |
| *A61B 5/273* | (2021.01) | |

(52) U.S. Cl.
CPC .............. *A61B 5/085* (2013.01); *A61B 5/251* (2021.01); *A61B 5/273* (2021.01); *A61B 5/6823* (2013.01); *A61B 5/7235* (2013.01)

(58) Field of Classification Search
CPC ... A61B 5/021; A61B 5/02158; A61B 5/7203; A61B 5/0208; A61B 2562/0247; A61B 2562/168
See application file for complete search history.

(56) References Cited

U.S. PATENT DOCUMENTS

| | | |
|---|---|---|
| 5,749,369 A | 5/1998 | Rabinovich et al. |
| 6,339,722 B1 | 1/2002 | Heethaar et al. |
| 8,386,028 B2 | 2/2013 | Cha et al. |
| 8,548,580 B2 | 10/2013 | Chetham et al. |

(Continued)

FOREIGN PATENT DOCUMENTS

WO    9318821 A1    9/1993

OTHER PUBLICATIONS

Leigh C Ward et al., "Determination of Cole parameters in multiple frequency bioelectrical impedance analysis using only the measurement of impedances", Institute of Physics Publishing, Jul. 10, 2006, pp. 839-850.

*Primary Examiner* — Sean P Dougherty
*Assistant Examiner* — Dakota R. Sabotka
(74) *Attorney, Agent, or Firm* — NKL Law; Jae Youn Kim

(57) ABSTRACT

Systems and methods for determining lung impedance of a subject by acquiring multiple impedance measurements from different areas of a thorax of the subject, using multiple electrical circuits, each electrical circuit comprising a pair of electrodes attached at different locations over the thorax of the subject. The acquisition of impedance measurements of all of the electrical circuits is done at the same timing-position(s) over the subject's breathing cycle. The acquired impedance measurements may be used to determine at least one physical characteristic associated with the respective subject. The electrical circuits may be powered by several generators outputting AC power at same or different frequencies. According to some embodiments, one of the electrical circuits, powered by one of the generators, may be continuously operated when measuring is done to be used as a timer.

9 Claims, 9 Drawing Sheets

(56) References Cited

U.S. PATENT DOCUMENTS

| | | |
|---|---|---|
| 2010/0228143 A1 | 9/2010 | Teschner et al. |
| 2010/0249640 A1 | 9/2010 | Cha et al. |
| 2015/0002177 A1 | 1/2015 | Chetham et al. |
| 2016/0008561 A1 | 1/2016 | Novotni et al. |
| 2017/0347910 A1* | 12/2017 | Shochat ............... A61B 5/0535 |
| 2018/0153432 A1 | 6/2018 | Skrabal et al. |
| 2019/0282817 A1* | 9/2019 | Muller .................. A61B 5/293 |
| 2020/0029825 A1* | 1/2020 | Tang .................... A61B 5/0205 |
| 2020/0324067 A1 | 10/2020 | Kremeier et al. |

\* cited by examiner

```
┌─────────────────────────────────────────────┐
│ Acquire multiple impedance measurements from│
│ different areas of a thorax of a subject,   │
│ using multiple electrical circuits, each    │
│ electrical circuit using a pair of          │
│ electrodes attached at different locations  │
│ over the thorax of the subject          41  │
└─────────────────────────────────────────────┘
                       │
                       ▼
┌─────────────────────────────────────────────┐
│ Determine a pulmonary (lung) impedance of   │
│ the subject, by using acquired impedances   │
│ from the impedance measurements of the      │
│ electrical circuits that are associated     │
│ with a same timing-position over the        │
│ subject's breathing cycle(s) associated     │
│ with the same breathing-cycle state     42  │
└─────────────────────────────────────────────┘
                       │
                       ▼
┌─────────────────────────────────────────────┐
│ Determine medical or physical condition of  │
│ the subject based on the determined         │
│ pulmonary impedance thereof             43  │
└─────────────────────────────────────────────┘
```

SYSTEMS AND METHODS FOR DETERMINING LUNG IMPEDANCE

CROSS-REFERENCE TO RELATED APPLICATION

This application claims priority to and the benefit of Italian Application No. 102021000010775, filed on Apr. 28, 2021, the disclosure of which is incorporated herein by reference in its entirety.

TECHNICAL FIELD

The present disclosure relates in general to devices, systems and methods for non-invasive measuring of one or more characteristics of biological organs and/or tissue, using electrical impedance measuring.

BACKGROUND

Responses and/or changes in responses of biological substances such as a specific organ, body part or tissue, of a subject to electrical stimuli such as an electric pulsed or continuous current, can be measured for determining various medical or physical states of the tested biological body part, substance or subject. Electrical impedance (herein also "impedance") is one such electrical responsivity to applied electric stimuli.

Impedance measurement of body parts/tissue etc. is used for measuring various medical/physical characteristics such as for measuring fat and/or muscle mass or density e.g. using a bio-impedance analysis (BIA) technique, for measuring various cardiologic conditions/parameters e.g. using impedance cardiography, etc.

BRIEF DESCRIPTION OF THE FIGURES

The figures illustrate generally, by way of example, but not by way of limitation, various embodiments discussed in the present document.

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. References to previously presented elements are implied without necessarily further citing the drawing or description in which they appear. The figures are listed below.

FIG. 4 is a flowchart illustrating a process for measuring lung impedance of a subject, according to some embodiments;

FIG. 6A shows transthoracic impedance that is acquired continuously and simultaneously with the frontal electrical circuits' impedance measurements acquired in a rapid cyclic manner; and FIG. 6A shows transthoracic impedance that is acquired continuously and simultaneously with the back electrical circuits' impedance measurements acquired in a rapid cyclic manner; FIG. 7A shows transthoracic impedance that is acquired continuously and simultaneously with the frontal electrical circuits' impedance measurements acquired in a rapid non-cyclic manner; and FIG. 7B shows transthoracic impedance that is acquired continuously and simultaneously with the back electrical circuits' impedance measurements acquired in a rapid non-cyclic manner.

DETAILED DESCRIPTION OF EMBODIMENTS

Figure 1:
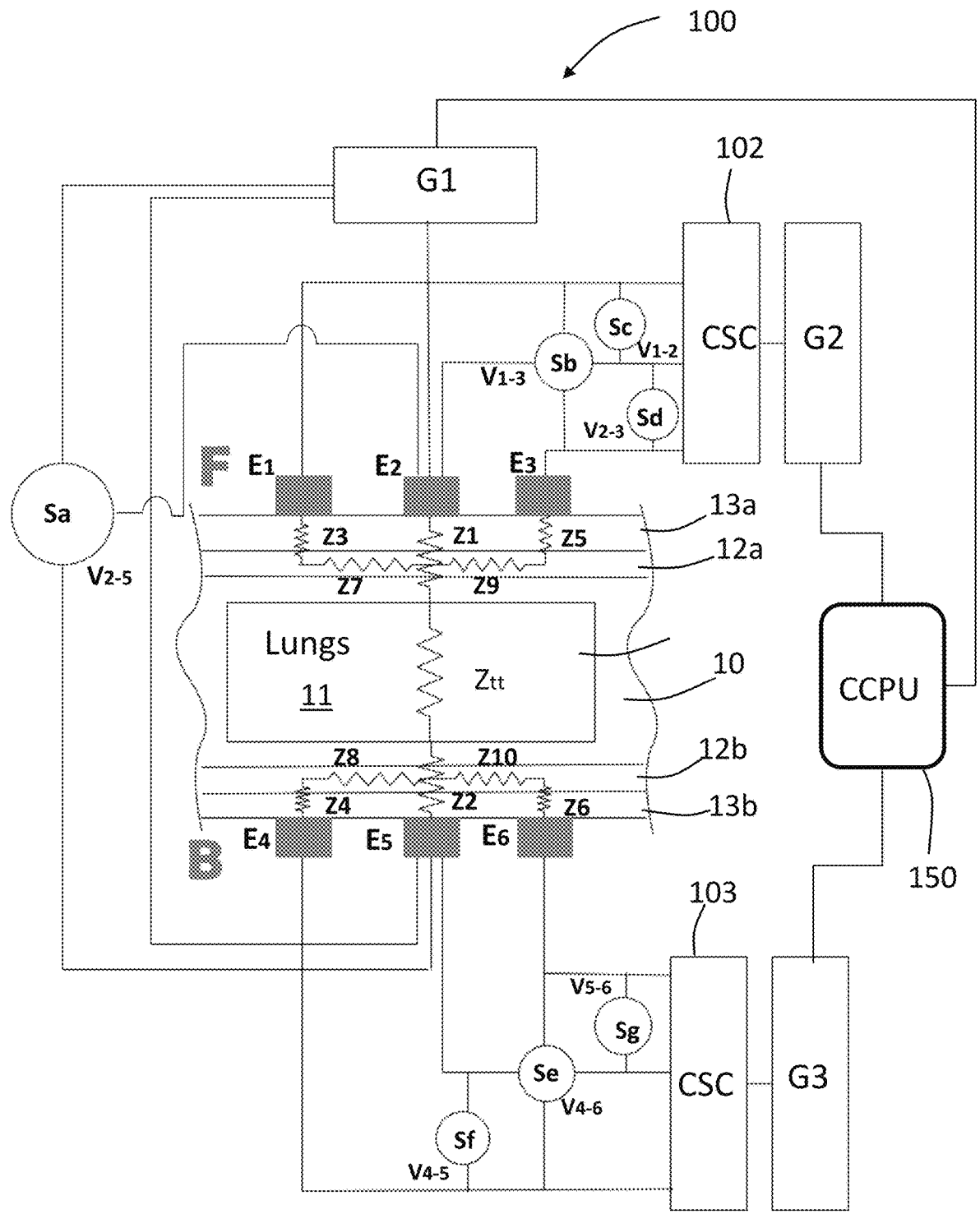
FIG. 1 shows a system for measuring lung impedance of a subject, using seven switchable electrical circuits including six electrodes and three generators, according to some embodiments.

Aspects of disclosed embodiments pertain to systems and methods for determining lung impedance of a subject e.g. for assess the medical or physical condition of the subject such as pulmonary and/or cardiologic related condition of the subject.

The term "subject" used herein preferably yet not exclusively refers to a human subject, patient or individual but may also refer to any animal having a respiratory system that includes lungs.

Aspects of disclosed embodiments pertain to systems and methods for determining lung impedance of a subject, by acquiring multiple impedance measurements from different areas of a thorax of a subject, using multiple electrical circuits, each electrical circuit using a pair of electrodes attached at different locations over the thorax of the subject, determining a lung impedance of the subject, by using selected impedances from the impedance measurements of the electrical circuits that are acquired at a same one or more timing-positions, which may be associated with a specific breathing state over the subject's breathing cycle.

Aspects of disclosed embodiments, pertain to a method for determining lung impedance of a subject, that may include at least the following steps:

providing: a first generator and a main electrical circuit powered by the first generator, and one or more additional generators each additional generator powering one or more additional electrical circuits, each electrical circuit using a pair of electrodes and is positioned and configured to measure impedance at a different area of a thorax of a subject;

selecting at least one time-position using a timer module that uses measurements from the main electrical circuit powered by the first generator;

selecting impedance measurements of one or more of the multiple electrical circuits that have been acquired at the selected at least one time-position; and determine a lung impedance of the subject, based on all selected impedance measurements acquired at the selected at least one time-position.

Some embodiments pertain to a system for determining lung impedance of a subject, the system comprising at least:
—multiple electrical circuits, positioned and configured for acquiring multiple impedance measurements from different areas of a thorax of a subject, each electrical circuit using a pair of electrodes, wherein one of the multiple electrical circuits serves as a main electrical circuit;

at least two generators comprising at least: a first generator used for powering the main electrical circuit; and one or more additional generators, each additional generator being used for powering at least one other electrical circuit, other than the main electrical circuit;

one or more sensors, located and configured to enable separate measuring of impedance of each of the multiple electrical circuits; and a central control and processing unit (CCPU) configured at least to:

(i) select at least one timing-position using a timer module that uses measurements from the main electrical circuit powered by the first generator;

(ii) select impedance measurements of one or more of the multiple electrical circuits that have been acquired at the selected at least one timing-position; and (iii) determine a lung impedance of the subject, based on all selected impedance measurements acquired at the selected at least one timing-position.

The acquisition of impedance measurements of all of the electrical circuits may be done at the same timing-position(s) over the subject's breathing cycle and therefore be associated with the same breathing state of the subject. The timed acquired impedance measurements may be used to determine at least one physical characteristic associated with the respective subject.

According to some embodiments, the electrical circuits of the system may be powered by several generators outputting alternating current (AC) power at same or different frequencies.

According to some embodiments, one of the electrical circuits, powered by one of the generators, may be continuously operated when measuring is done to be used as a timer.

To use impedance(s) measurements from each electrical circuit that are associated (e.g. occurring) at the timing-position within the subject's breathing cycle (e.g. all occurring at a full inspiration and/or full expiration over the breathing cycles of the subject), the acquisition of impedance measurements from each electrical circuits may be performed during a registered acquisition-time-span $ATSi_i$ of the respective electrical circuit "i", such that each value of the measured impedance, of the respective electrical circuit, is associated with a different value over the acquisition-time-span $ATS_i$ of the respective electrical circuit. The registered acquisition-time-span $ATSi_i$ for each electrical cycle may include more than one breathing cycles (several breathing cycles).

It is noted that the terms inspiration and expiration referring to subjects' breathing may be used interchangeably herein with the terms "inhalation" and "exhalation", respectively.

According to some embodiments, the systems and methods may be configured to:

detect changes (over a time-span of several breathing cycles) in value such as of a detectable parameter such as intensity or amplitude of the respective subject, in respect to timing-positions over each acquisition-time-span $ATS_i$ of each electrical circuit, the parameter being related to the subject's breathing cycle such that each parameter value is associated with a different time-value over the subject's breathing cycle;

identify or select a specific timing-position over the breathing cycle of the subject that corresponds to a specific breathing state of the subject such as full inspiration/expiration;

select at least one measured impedance from each impedance measurement acquisition of each electrical circuit, that is associated with the identified timing-position $t_i$, in its respective acquisition-time-span $ATS_i$.

based on the aforementioned, the determination of the lung impedance of the respective subject may be performed, by using the selected (acquired) impedances of all the electric circuits thereby enabling calculating the lung impedance based on impedances that are all associated with the same position over the breathing cycles of the subject.

The term "timing-position" bused herein may refer to a time-point and/or short predefined time-range $\Delta t_i$ over a breathing cycle time-span (BCTS) of the specific subject e.g. the breathing cycle being a time-span $\Delta T$ between full expiration and full inspiration.

According to some embodiments, the selection of the impedances for calculating the lung impedance as well as the actual calculation of the lung impedance may be carried out in a post-acquisition (e.g. offline) process after all impedances from all circuits have been acquired and registered.

According to some embodiments, the BCTS of each subject at each particular date and time may vary and therefore the BCTS may be measured and averaged for a particular period of time that is close or including the lung impedance measurement session.

Alternatively, the BCTS may be deduced from the relation between the measured parameter and time, based on the substantially periodic nature of breathing.

It should be noted that since each subject can exhibit a different breathing pattern at each particular period, a preliminary process personal per each subject may be performed to estimate an average BCTS of the respective subject, preferably done in close proximity (timewise) to the actual lung impedance measuring session trying to maintain the subject in a steady breathing pace i.e. having similar or equal breathing-cycles time-spans.

The lung impedance measurements may be used to assess one or more medical or physical conditions of the respective subject, using a diagnosis model, for example, for diagnosis of pulmonary and/or cardiology conditions such as pulmonary congestion and/or lung/cerebral edema/or organ fluid status in other compartments of the body.

To assess a medical condition of a subject such as pulmonary congestion, two lung impedance measurements may be required taken for two different time value or states: e.g., one at full expiration and one at full inspiration, for determining pulmonary congestion based on difference between the lung impedance $\Delta ZL$ at full inspiration state and the lung impedance at full expiration state of the subject.

The term "impedance measurement", "impedance acquisition", or "impedance measuring" may relate to direct or indirect measuring of the impedance, such as measuring of one or more characteristics of the electrical circuit (e.g. electrical voltage/current) that correspond (e.g. mathematically related) to the impedance of the respective electrical circuit.

According to some embodiments, there is provided a system for determining lung impedance of a subject, including at least:

multiple electrical circuits, positioned and configured for acquiring multiple impedance measurements from different areas of a thorax of a subject, each electrical circuit using a pair of electrodes and a sensor, for sensing at least one property of the electrical circuit, indicative of the impedance of the respective electrical circuit;

one or more generators each powering at least one of the multiple electrical circuits; and a central control and processing unit (CCPU) configured to receive output data from the sensors of the electrical circuits, determine impedances of each electrical circuit over an acquisition-time-span $ATS_i$ of the respective electrical circuit "i", select at least one impedance $Z_i$ from the determined impedances of each respective electrical circuit all selected impedances from all electrical circuits being associated with a same timing-position over the subject's breathing cycle, and determine, based on the selected impedances of all electrical circuits, a lung impedance of the respective patient.

The system may use at least one timer module, such as a timer device, a commutator, etc. configured to register acquisition-time-span $ATSi_i$ of each electrical circuit "i" of the multiple electrical circuits, such that each value of the measured impedance, of the respective electrical circuit "i", is associated with a different time-value over the acquisition-time-span $ATS_i$ of the respective electrical circuit.

According to some embodiments, the CCPU may further be configured to:

detect changes in value of a detectable parameter of the respective subject, in respect to timing-positions over each acquisition-time-span $ATS_i$ of each electrical circuit, the parameter being related to the subject's breathing cycle such that each parameter value is associated with a different time value over the subject's breathing cycle;

select a parameter value and identify its corresponding timing-position $t_i$ in each acquisition-time-span $ATS_i$ of each electrical circuit; and select at least one measured impedance from each impedance measurement acquisition of each electrical circuit, that is associated with the identified timing-position $t_i$, in its respective acquisition-time-span $ATS_i$, based on the parameter value selected and its respective timing-positions.

According to some embodiments, the parameter being used can be one or more of:

a transthoracic impedance $Z_{tt}$, acquired by using a main electrical circuit, which is one of the multiple electrical circuits, configured and positioned to measure the transthoracic impedance $Z_{tt}$ of the respective subject, the main electrical circuit may be operated in a continuous manner, to enable associating timing-positions in which a selected value thereof $Z_{tt\_s}$ (e.g. maximum or minimum amplitude value of the main electrical circuit) is detected, with timing-positions of corresponding impedances measured in the other electrical circuits; and/or subject's chest movements that may be measured or deduced from output data of at least one detector configured to continuously measure the respective parameter or another parameter associated with the subject's chest movements, during acquisition of impedance measurements of all the electrical circuits—to enable identification of specific timing positions in the subject's breathing cycle.

The main electrical circuit may use two electrodes, a front main electrode positioned over a central frontal side of the subject's thorax and a back main electrode, positioned at a central back side of the subject's thorax.

The at least one detector may be one or more of: a piezoelectric transducer, a mechanical sensor.

According to some embodiments, the multiple electrical circuits may use six electrodes: three electrodes E1, E2 and E3 attached to the front side of the subject's thorax and three back electrodes E4, E5 and E6 attached to the back side of the subject's thorax and three generators: a first generator $G_1$ powering the main electrical circuit E2-E5 and outputting AC power of a first frequency $f_1$, a second generator $G_2$, powering front electrical circuits: E1-E2, E2-E3 and E1-E3 in a switchable manner controllable via the CCPU, $G_2$ outputting AC power at a second frequency $f_2$, which is distinctly different than the first frequency $f_1$, and a third generator $G_3$, powering back electrical circuits: E4-E5, E5-E6 and E4-E6 in a switchable manner controllable via the CCPU, $G_3$ outputting AC power at a third frequency $f_3$, which is distinctly different than the first frequency $f_1$ (where $f_3$ may be equal to or different from $f_2$).

Using several generators may dramatically reduce the overall acquisition time-span, since each pair of additional circuits can be measured simultaneously while the main electrical circuit is operated and measured throughout the acquisition time-span. Additionally, using at least two different frequencies: a first frequency $f_1$ of the main generator G1 (e.g. $f_1$=100 KHz outputting at 1 mA) whereas the other generators G2 and $G_3$ output AC power of a second different frequency $f_2/f_3$ (e.g. $f_{2/3}$=80 KHz) helps reducing electrical leakage between the electrical circuits.

Since the number of electrical circuits (seven in this example) is larger than the number of generators and electrodes being used, the CCPU may be configured to control switching between the electrical circuits E1-E2, E2-E3 and E1-E3 of the front electrodes, by switching generator's G2 connection to electrode-pairs of the circuits, at different times for acquiring their respective impedances at different time-spans from one another, and switching between the electrical circuits E4-E5, E5-E6 and E4-E6 of the back electrodes, by switching generator's G3 connection to electrode-pairs thereof at different times for acquiring their respective impedances at different time-spans from one another, while associating timing-position of each acquired value of the transthoracic impedance $T_{tt}$ measured continuously by the main electrical circuit, in respect to timing-positions of impedances measured for each of the other electrical circuits within each of their respective acquisition-time-span.

In some embodiments, the front set of electrical circuits E1-E2, E2-E3 and E1-E3 may be allocated each with a same acquisition time-span $ATS_{front}$, which may be of a few breathing cycles of the subject. Since all front set electrical circuits use the same generator G2, the CCPU may controllably switch between the circuits such that each is being operated for that allocated acquisition time-span $ATS_{front}$.

Similarly, the back set of electrical circuits E4-E5, E5-E6 and E4-E6 may be allocated each with a same acquisition time-span $ATS_{back}$, which may be of a few breathing cycles of the subject and equal to the frontal acquisition time-span $ATS_{front}$. Since all back set electrical circuits use the same generator G3, the CCPU may controllably switch between the circuits such that each is being operated for that allocated acquisition time-span $ATS_{back}$.

Back and front electrical circuits may be measured simultaneously for requiring a total of acquisition time-span $ATS_{front}$ or $ATS_{back}$ (herein "total measurement time-span TMTS") of several breathing cycles, for conducting impedance measurements for these six electrical circuits (e.g. a TMTS of 18 seconds or a minimum measuring time of 10 seconds).

According to some embodiments, since the main electrical circuit uses a separate generator $G_1$, the transthoracic impedance measurement performed thereby may be carried out during impedance measurements of all the other circuits, e.g. throughout the entire TMTS.

Reference is now made to FIG. 1 showing a system 100 for measuring lung impedance of a subject, using seven electrical circuits for at least seven different impedances measurements, using three front electrodes and three back electrodes, according to some embodiments. The system 100 includes:

- a front set of electrodes: E1, E2 and E3, where E2 is a front central electrode and E1 and E3 are front side electrodes, and wherein: electrode E1 is connectable to electrode E2 and to E3 in a switchable manner to form front electrical circuits E1-E2 and E1-E3, and electrode E3 is further connectable to electrodes E2 to form front electrical circuit: E2-E3;
- a back set of electrodes: E4, E5 and E6, where E5 is a back central electrode and E4 and E6 are back side electrodes, and wherein: electrode E4 is connectable to electrode E5 and to E6 in a switchable manner to form front electrical circuits E4-E5 and E4-E6 and E5-E6;
- where E2 and E5 are also connectable forming a main electrical circuit E2-E5,
- three AC generators: G1, G2 and G3, where the first generator G1 generates AC power of a first frequency $f_1$, and G2 and G3 generate AC power of a second, different frequency $f_2$, where G1 supplies AC power to the main electrical circuit E2-E5, G2 is connectable in a switchable manner to supply power to electrical circuits E1-E2, E2-E3 and E1-E3, and G3 is connectable in a switchable manner to supply power to electrical circuits E4-E5, E5-E6 and E4-E6;
- sensors: $S_a$, $S_b$, $S_c$, $S_d$ and $S_e$, $S_f$, $S_g$ each configured and connected such as to measure one or more properties of a different electrical circuit, the one or more properties. For example, the sensors may include potentiometers each configured to measure voltage of a respective electrical circuit:
- $S_a$ may be positioned in the main electrical circuit for measuring electrical properties of electrical circuit E2-E5,
- $S_b$ may be positioned such as to measure electrical properties of electrical circuit E1-E3,
- $S_c$ may be positioned such as to measure electrical properties of electrical circuit E1-E2,
- $S_d$ may be positioned such as to measure electrical properties of electrical circuit E2-E3,
- $S_e$ may be positioned such as to measure electrical properties of electrical circuit E4-E6,
- $S_f$ may be positioned such as to measure electrical properties of electrical circuit E4-E5,
- $S_g$ may be positioned such as to measure electrical properties of electrical circuit E5-E6;
and
- a central control and processing unit (CCPU) 150, configured to receive output sensors Sa-Sg signals/data and control switching between electrical circuits of the first and second sets, as well as to analyze the received sensors output signals/data to calculate the subject's lung impedance and optionally also for determining one or more medical/physical condition based on the calculated lung impedance.

The "back" and "front" being related to back side B and front sides F of the subject's thorax 10.

According to some embodiments, the front set of electrodes E1, E2 and E3 may be noninvasively attached to the skin of the subject's front chest side and the back set of electrodes E4, E5 and E6 may be noninvasively attached to the skin of the subject's back chest side, located such that each pair of opposite electrodes: E1-E4, E2-E5 and E3-E6 is at approximately the same height.

According to some embodiments, impedance measurements of each electrical circuit may be performed by deducing thereof from an output signal/data of the sensor of the respective circuit.

According to some embodiments, G1 may be continuously operated only to power the main electrical circuit E2-E5, for enabling continuous measuring of transthoracic impedance $Z_{tt}$ of the subject. The value of the transthoracic impedance $Z_{tt}$ may vary during a time-span of each breathing cycle of the subject and may therefore be used also for selecting a value thereof (such as an extremum intensity point of the sensor Sa output signal) for selecting acquired impedances of the other electrical circuits that are associated with the same timing-position over the breathing cycle of the subject as the timing positions in which this value has been detected.

As specified above, the main electrical circuit E2-E5 may be continuously measured and time-registered such that each value of the $Z_{tt}$ can be associated with a different time-value during the total measurement time-span (TMTS). Since the TMTS includes the measurements also of all other electrical circuits, each impedance measurement value (herein impedance) of each circuit is associate with a timing-position over the TMTS and can therefore select the other impedances for the lung impedance determination/calculation by selecting impedances from each circuit that are positioned at the selected value timing-positions (e.g. maximum points over the time axis).

As shown in FIG. 1, the generators G2 and G3 may each connect to a circuits-set controller (CSC) 102 or 103, respectively, each CSC may be configured for switching between the various electrical circuits in the respective circuits-set and to register time of the operation ($ATS_i$) of the respective circuits.

For example, the CSC 102/103 may be configured to register beginning and end of each $ATS_i$ of each circuit for identifying when each acquisition has occurred in respect to the TMTS, which is the main electrical circuit's acquisition time-span.

According to some embodiments, each CSC of 102 and 103 may include an electrical commutator for acquisition time registration of each of the electrical circuits, operable via generators G2 or G3.

According to some embodiments, the calculation of the lung impedance $Z_L$ of the subject may be carried out by correcting or improving the roughly measured value of the transthoracic impedance $Z_{tt}$ using impedances of the other electrical circuits for reducing or eliminating electric resistance of front and back skin and/or fatty tissue of the thorax, which affect the accuracy of the transthoracic impedance $Z_{tt}$, therefore the lung impedance is an accuracy-improved or corrected value of the transthoracic impedance $Z_{tt}$ at the selected timing-positioning thereof in respect the subject's breathing cycle. The lung impedance $Z_L$ may be calculated according to the following calculations (the term "selected" used below refers to selection based on matching a same timing-position in the subject's breathing cycle):

$Z_{tts}$—is the selected transthoracic impedance derived from output signal/data of sensor $S_a$;

$Z_b$—is the selected impedance of electric circuit of E1-E3 derived from output signal/data of sensor $S_b$;

$Z_c$—is the selected impedance of electric circuit of E1-E2 derived from output signal/data of sensor $S_c$;

$Z_d$—is the selected impedance of electric circuit of E2-E3 derived from output signal/data of sensor $S_d$;

$Z_e$—is the selected impedance of electric circuit of E4-E6 derived from output signal/data of sensor $S_e$;

$Z_f$—is the selected impedance of electric circuit of E4-E5 derived from output signal/data of sensor $S_f$;

$Z_g$—is the selected impedance of electric circuit of E5-E6 derived from output signal/data of sensor $S_g$;

$Z_1$ is associated with the impedance of the skin in the area of electrode E2;

$Z_2$ is associated with the impedance of the skin in the area of electrode E5;

$Z_3$ is associated with the impedance of the skin in the area of electrode E1;

$Z_4$ is associated with the impedance of the skin in the area of electrode E4;

$Z_5$ is associated with the impedance of the skin in the area of electrode E3;

$Z_6$ is associated with the impedance of the skin in the area of electrode E6;

$Z_7$ is associated with the impedance of the skin between electrode E1-E2;

$Z_8$ is associated with the impedance of the skin between electrode E4-E5;

$Z_9$ is associated with the impedance of the skin between electrode E2-E3;

$Z_{10}$ to is associated with the impedance of the skin between electrode E5-E6.

The above impedances $Z_1$-$Z_{10}$ may also include front and back fatty skin 12a and 12b resistance in the respective areas located between the respective front and back skin tissue layers 13a and 13b and the lungs 11 of the subject.

The relations between the electrical circuits' impedances $Z_a$-$Z_g$ and the skin and/or fatty tissues areas impedances $Z_1$-$Z_{10}$ may be as follows:

$$Z_L = Z_{tts} + Z_1 + Z_2$$

$$Z_b = Z_1 + Z_7 + Z_3$$

$$Z_c = Z_1 + Z_9 + Z_5$$

$$Z_d = Z_3 + Z_7 + Z_9 + Z_5$$

$$Z_e = Z_2 + Z_8 + Z_4$$

$$Z_f = Z_2 + Z_{10} + Z_6$$

$$Z_g = Z_4 + Z_8 + Z_6$$

Therefore:

$$ZpZ1 = Ztts - \left\{ \frac{(Zb + Zc - Zd)}{2} + \frac{(Ze + Zf - Zg)}{2} \right\}$$

In some embodiments, time differences between measurements of Z1-2, Z2-3, Z1-3, Z4-5, Z5-6, Z4-6 and/or acquisition duration for each of these circuits may be about 10 msec (milliseconds), while $Z_{tts}$ is measured continuously throughout the acquisition also of Z1-2, Z2-3, Z1-3, Z4-5, Z5-6, Z4-6. Z1-2, Z2-3. Signal from E1-E2, E2-E3, E1-E3, E4-E5, E5-E6, E4-E6 and E2-E5 may be acquired during several breathing cycles of the subject (e.g., between 10-20 sec covering more than one breathing cycle). Correspondingly, Z1-2, Z2-3, Z1-3, Z4-5, Z5-6, Z4-6 and $Z_{tts}$ values of 10-60 msec frames may be used for calculation of multiple $Z_L$ values. By this way we may be able to achieve $Z_L$ of several breathing cycles. (As a result, we may calculate $Z_L$ also at full inspiration and/or full expiration timings for monitoring Lung Impedance values at full inspiration or expiration may be used for medical diagnosis. Values of Z1-2, Z2-3, Z1-3, Z4-5, Z5-6, Z4-6 and $Z_{tts}$ may be used for calculation of respiration cycle, corresponding to the same timeframe. Ratio of maximal inspiration to maximum expiration may be calculated and used as an additional data which may be associated with deepness of breathing.

According to embodiments, the measuring of each of the three acquisitions of the various circuits may take between 30-60 msec.

Difference between $Z_L$ of full inspiration and full expiration may be roughly 5 ohms or more. Normally, lung impedance is in the area of 50 ohms (varies depending on subject's size, weight etc. For example, a slim healthy subjects' lung impedance is normally between 30-40 Ohms). For subjects suffering from pulmonary congestion Lung impedance may decrease by 5 Ohms or more (10% or more from calculated value) e.g., due to significant fluid accumulation and clinical deterioration of the subject. Therefore, errors in calculation of the lung impedance due to breathing cycle mismatch that may be in the same area of impedance differences caused due to medical anomalies, may derive in sever misinterpretation of clinical status of the subject. The proposed new scheme of breathing-cycle-coordinated lung impedance measuring may dramatically reduce errors in calculation of lung impedance by 10-20% or more and therefore dramatically improve diagnosis of the medical condition of the subject based on lung impedance measuring and calculation.

According to some embodiments, the transthoracic impedance value selected may be an average of all the transthoracic impedances measured at all the timing-positions over the TMTS associated with the same breathing cycle state such as all $Z_{tt}$ maximum/minimum points in a sinusoid indicating the periodic behavior of the transthoracic impedance that corresponds to the periodic behavior of the breathing cycles of the subject.

The circuitry configuration as shown in FIG. 1 is adapted for using potential measurements for measuring voltage, therefore showing the sensors to be connected in a parallel connection. In other embodiments (not shown) current measurements may be used for the impedance measurements, using current sensors, in which case the circuitry design may be altered to accommodate serial connection of the sensors to their respective electrical circuits.

Figure 2:
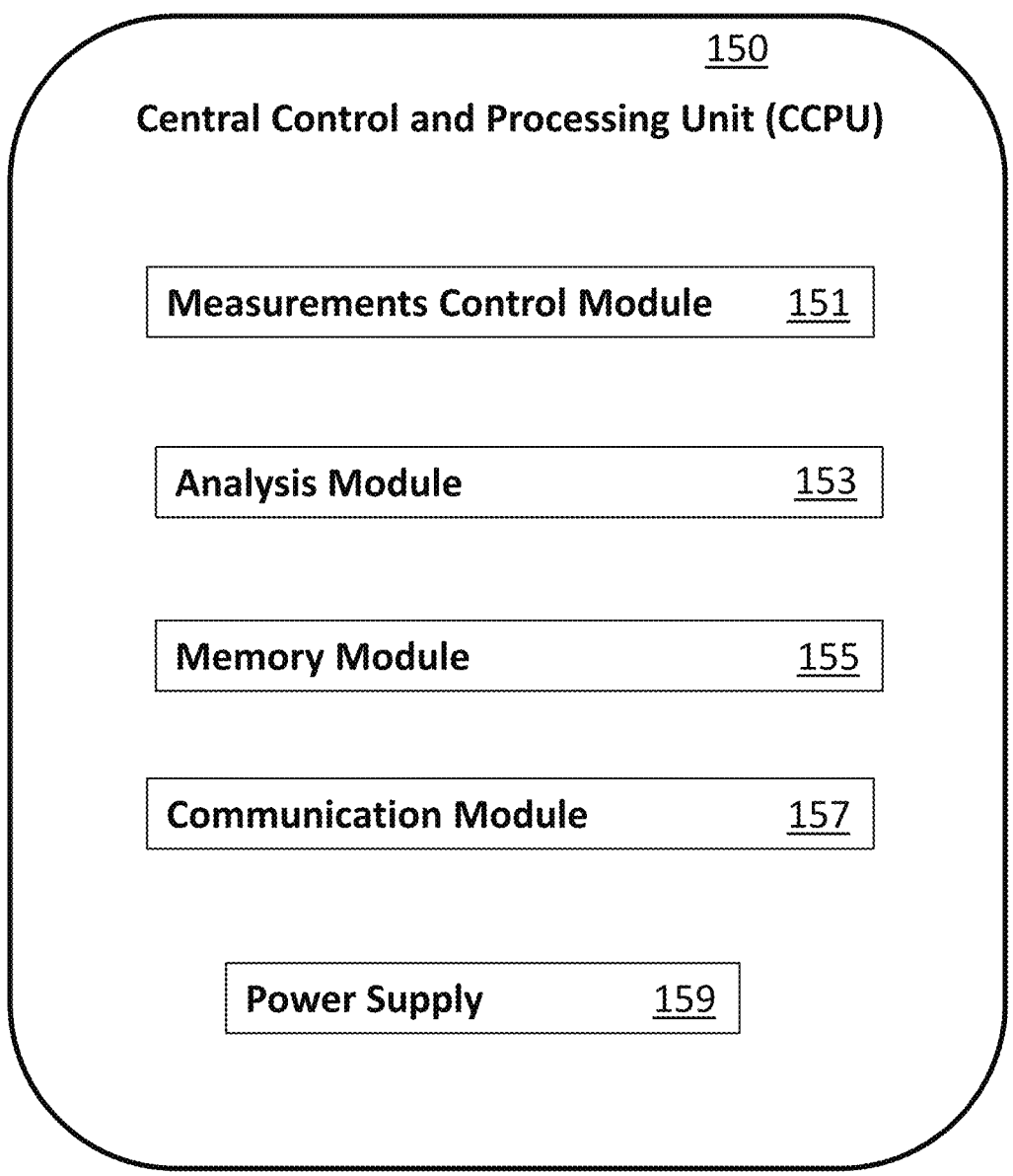
FIG. 2 is a block diagram, showing modules of a central control and processing unit (CCPU) of a system for measuring lung impedance, according to some embodiments.

Reference is made to FIG. 2, illustrating components of the CCPU 150 of the system 100, according to some embodiments. The CCPU 150 may include:

- a measurements control module 151, configured to control operation of the generators G1-G3 and the circuits sets controllers 102 and 103, for controlling impedances acquisition timing;
- an analysis module 153, configured to receive sensor Sa-Sg output signals/data and analyze the received data to determine the lung impedance(s) of each pulmonary measuring session and to assess medical/physical condition of the subject based on one or more subject's lung impedances analysis results;
- a memory module 155, configured for storage of measured data and analysis results information, e.g. to enable the analysis of the received signals/data and to enable retrieving and analyzing subject's accumulated information indicative of the subject's medical and/or personal information (e.g. known medical condition, medical history, personal details such as age, gender weight, height etc.) and accumulated past analysis and diagnostic results (e.g. determined lung impedances of past measurements sessions), where the accumulated information analysis is analyzable via the analysis module 153;

a communication module 157, configured for communication with one or more system 100 external and/or internal devices such as detector(s) used for measuring parameter(s) associated with the subject's breathing cycles, one or more communication and/or computerized devices for sending analysis results and/or alert information thereto and/or receiving subjects' medical and personal details therefrom etc.; and a CCPU power supply 159 such as batteries, connection to a power supply grid etc., for powering at least the CCPU 150.

According to some embodiments the sensors $S_a$-$S_g$ may each include its own power source (e.g. battery(ies)).

Figure 3:
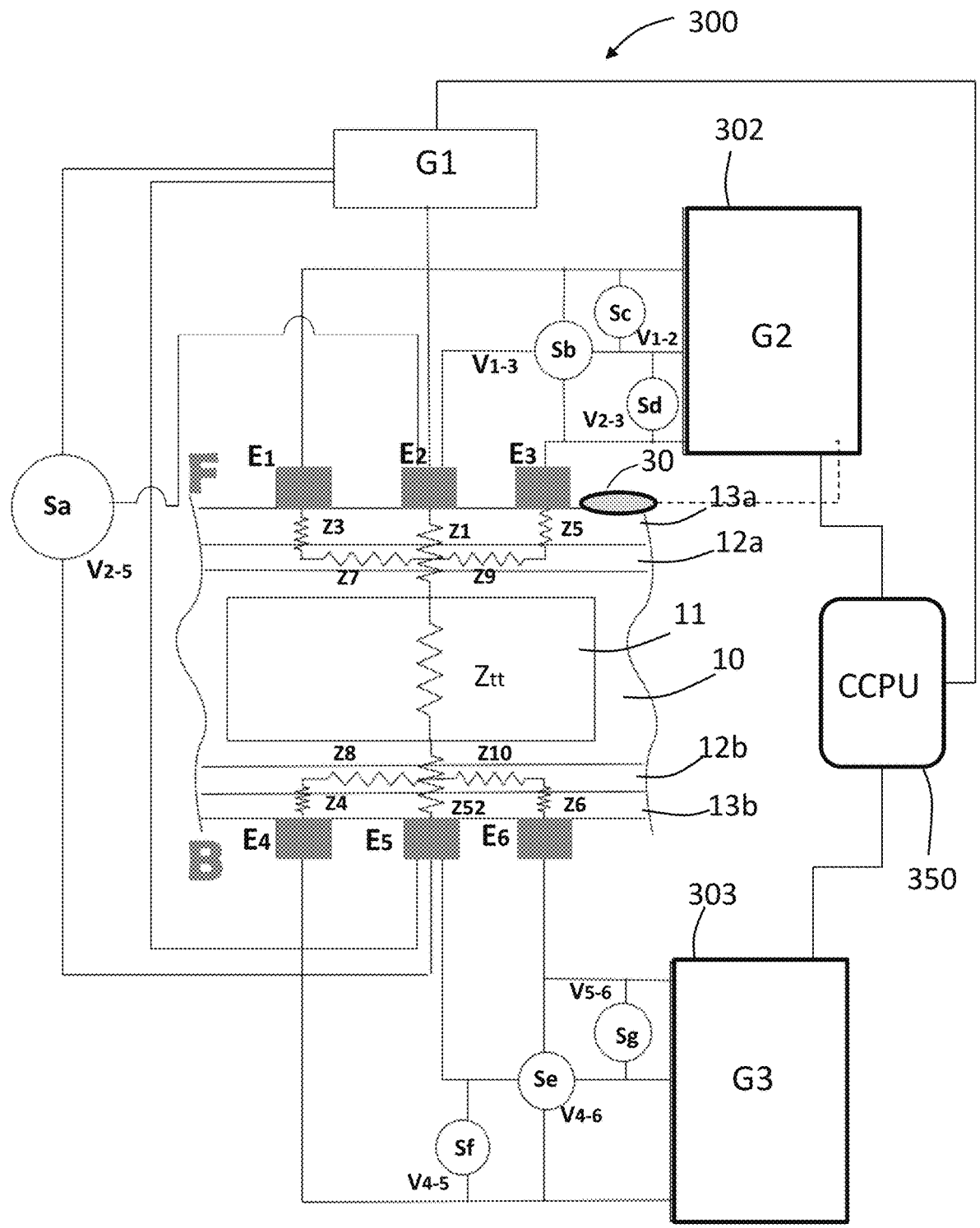
FIG. 3 shows a system for measuring lung impedance of a subject, using seven switchable electrical circuits and three generators and a sensor for ongoing measuring of a parameter value associated with the subject's breathing cycle, according to some embodiment.

Reference is made to FIG. 3, schematically illustrating a system 300, for determining lung impedance of subjects, according to some embodiments, using a detector 30 for determining timing-positions over the TMTS associated with a same state in the subject's breathing cycle, for selection impedances measurements. The system 300 include a similar configuration to that as described in respect to the system 100 of FIG. 1 including:

three generators G1-G3, wherein G1 is configured to power the main electrical circuit formed by electrodes E2 and E5 (herein circuit E2-E5) and measured using sensor $S_a$; G2 is configured to power circuits E1-E3, E1-E2 and E2-E3, respectively measured via sensors $S_b$, $S_c$ and $S_d$; and G3 is configured to power circuits E4-E6, E4-E5 and E5-E6, respectively measured via sensors $S_e$, $S_f$ and $S_g$;

a CCPU 350; and a detector 30, positioned over the front side of the subject's thorax 10 and configured to detect one or more parameters associated with the subject's breathing cycles such that each parameter value can be associated with a specific timing-position (correlated with a breathing state) over the breathing cycle(s) of the subject.

For example, the detector may include a piezoelectric transducer attached to the front side thorax 10 of the subject configured and positioned such as to detect chest movements of the subject for determining full inspiration and full expiration states of the subject and identify a corresponding parameter value. The CCPU 350 may be configured to receive data from the detector 30 select parameter value for impedance measurements (e.g. extremum output signal intensities of the detector indicative of full inspiration positioning within the subject's breathing cycle) and select a impedances measurements from all electrical circuits: E2-E5, E1-E3, E1-E2, E2-E3, E4-E6, E4-E5 and E5-E6 acquired at timing-positions that are associated with the timing-positions of the selected parameter's extremum value detection.

According to some embodiments, the detector 30 may be set to continuously detect the parameter value throughout the TMTS of the respective measuring session.

Reference is made to FIG. 4, showing a process for measuring lung impedance of a subject, according to some embodiments, the process including at least the steps of:

acquiring multiple impedance measurements from different areas of a thorax of a subject, using multiple electrical circuits, each electrical circuit using a pair of electrodes attached at different locations over the thorax of the subject 41;

determining a lung impedance of the subject, by using acquired impedances selected from the impedance measurements of the electrical circuits that are associated with a same timing-position over the subject's breathing cycle, the timing-position being associated with a specific breathing-cycle state 42; and determining a medical or physical condition of the subject, based on the subject's determined lung impedance 43.

Figure 5:
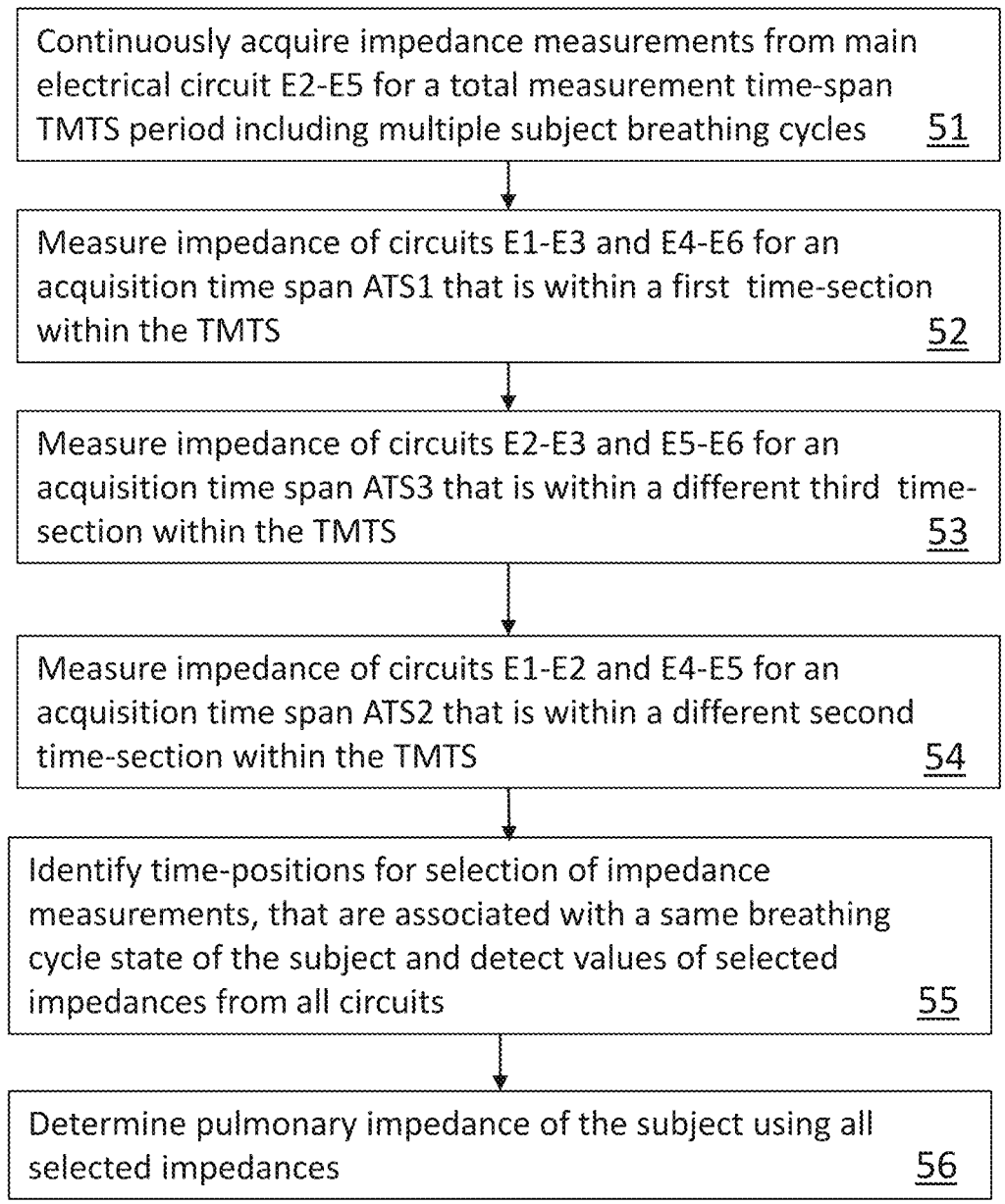
FIG. 5 is a flowchart illustrating a process for measuring lung impedance of a subject, using seven switchable electrical circuits including six electrodes and three generators, according to some embodiments.

Reference is made to FIG. 5 showing a process for determining lung impedance using the system 100 configuration, according to some embodiments. This process includes the steps of:

continuously acquiring impedance measurements from main electrical circuit E2-E5 for a total measurement time-span TMTS period including multiple subject breathing cycles 51;

measure impedance of circuits E1-E3 and E4-E6 for an acquisition time span ATS1 that is within a first time-section within the TMTS 52;

measure impedance of circuits E2-E3 and E5-E6 for an acquisition time span ATS3 that is within a different third time-section within the TMTS 53;

measure impedance of circuits E1-E2 and E4-E5 for an acquisition time span ATS2 that is within a different second time-section within the TMTS 54;

identify timing-positions for selection of impedance measurements, that are associated with a same breathing cycle state of the subject and detect values of selected impedances from all circuits 55; and determine lung impedance of the subject using all selected impedances 56.

According to some embodiments, steps 55-56 may be carried out after all impedances are acquired as a post-acquisition lung impedance calculation process.

Measurements of circuits E1-E2, E2-E3, E1-E3 (powered by G2) and E4-E5, E5-E6, E4-E6 (powered by G3), as showed above, can be done in a cyclic manner per circuits group, in which:

for the first (front) circuits group: E1-E2, E2-E3, E1-E3 circuit E1-E2 is acquired first, circuit E2-E3 is acquired second and circuit E1-E3 is acquired third; and for the second (back) circuits group: E4-E5, E5-E6, E4-E6 circuit E4-E5 is acquired first, circuit E5-E6 is acquired second and circuit E4-E6 is acquired third.

Figure 6A:
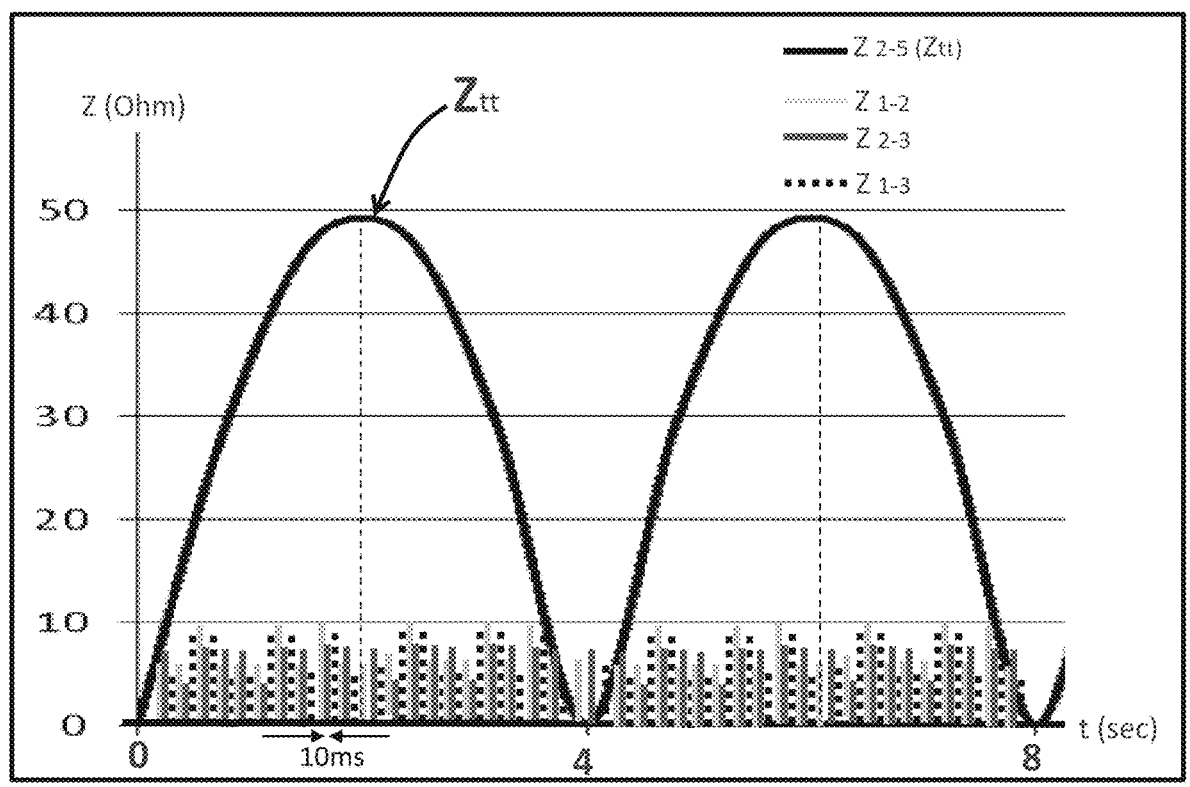
FIGS. 6A-6B show graphs of simulated behavior over time of a subject's transthoracic impedance vs. time and multiple additional impedance measurements acquired in a rapid cyclic manner.
Figure 6B:
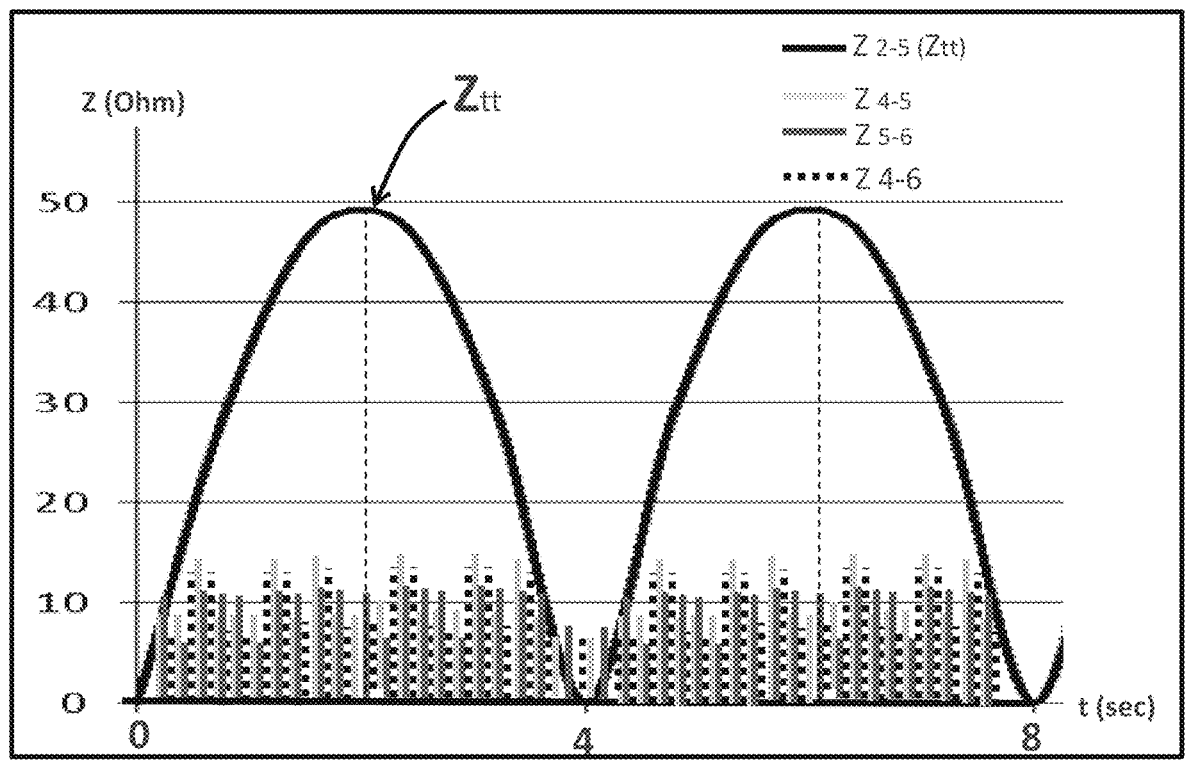

Reference is now made to FIGS. 6A and 6B schematically illustrating how the impedances $Z_{tt}$, $Z_{1-2}$, $Z_{2-3}$, and $Z_{1-3}$, (FIG. 6A) and $Z_{tt}$, $Z_{4-5}$, $Z_{5-6}$, and $Z_{4-6}$, (FIG. 6B), can be cyclically measured for short measuring periods, using the same circuitry configuration of the six electrodes E1-E6 and three generators G1-G3, where G2 and G3 generate AC output power of a different frequency than that of generator G1, according to some embodiments.

In FIG. 6A, impedances of the main circuit E2-E5 ($Z_{tt}$) is measured continuously and may output a sinusoid (herein shown in a schematic manner as an ideal sinusoid—however actual subject's breathing is not 100% accurate in terms of maintaining constant amplitude and wavelength) exemplified as having an amplitude of 50 Ohms and a breathing cycle of 4 seconds.

Impedances $Z_{1-2}$, $Z_{2-3}$, and $Z_{1-3}$, may be acquired via corresponding electrical circuits that are separately powered by generator G2 in a switchable manner, such that the circuits E1-E2, E2-E3 and E1-E3 are cyclically and rapidly switched therebetween for acquiring impendences thereof. For example, each such acquisition period may be between 5-50 msec (milliseconds) in FIG. 6A exemplified as having a 10 msec span. In this way within each breathing cycle of a subject (e.g., of 4 sec) each of the other electrical circuit's impedance is measured rapidly for a few milliseconds of a few dozens of milliseconds (e.g., 10 msec) in a cyclic order, for example: having the order of the electrical circuits switching and measuring order repeated: first E1-2 then E2-3 and then E1-3—each circuit measured for impedance for a few milliseconds having that order of circuits switching repeated throughout the acquisition time-span of the transthoracic impedance.

Similar method of acquisition as described for FIG. 6A is simultaneously carried out for the electrical circuits E4-5, E5-6 and E4-6 powered by generator G3, as shown in FIG. 6B for rapid and cyclic switching and acquisition of corresponding impedances: $Z_{4-5}$, $Z_{5-6}$, and $Z_{4-6}$.

As shown in FIGS. 6A and 6B, cyclically switching the same order of electrical circuits, per circuits group, may cause that it will always be the same circuit that is under acquisition at the time-point that corresponds to a selected location such as a maximum $Z_{tt}$ location, over the time axis (in this example of FIGS. 6A-6B circuits $Z_{1-2}$ and $Z_{5-6}$ will always be measured at the exact time point of the breathing cycle maximum transthoracic impedance), while the other circuits of the same group will be off-set over the time axis in relation to the selected point over the time axis.

Figure 7A:
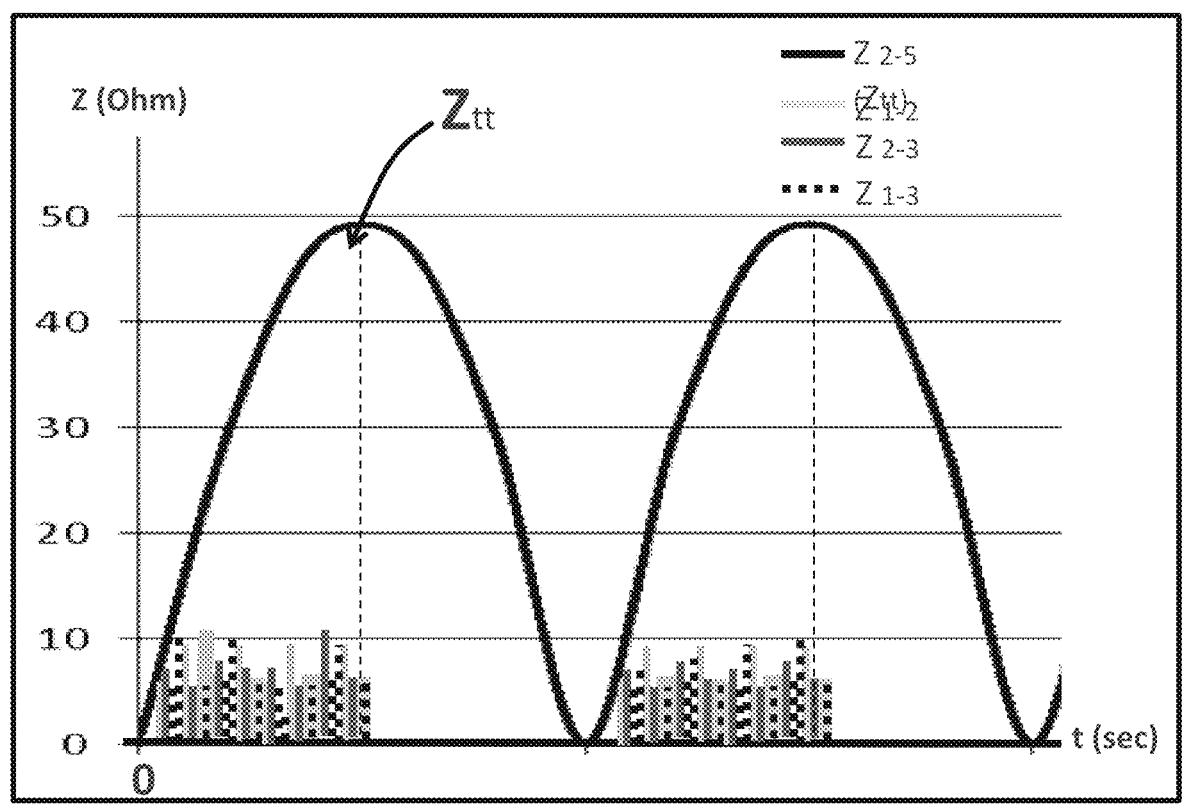
FIGS. 7A-7B show graphs of simulated behavior over time of a subject's transthoracic impedance vs. time and multiple additional impedance measurements acquired in a rapid non-cyclic manner.
Figure 7B:
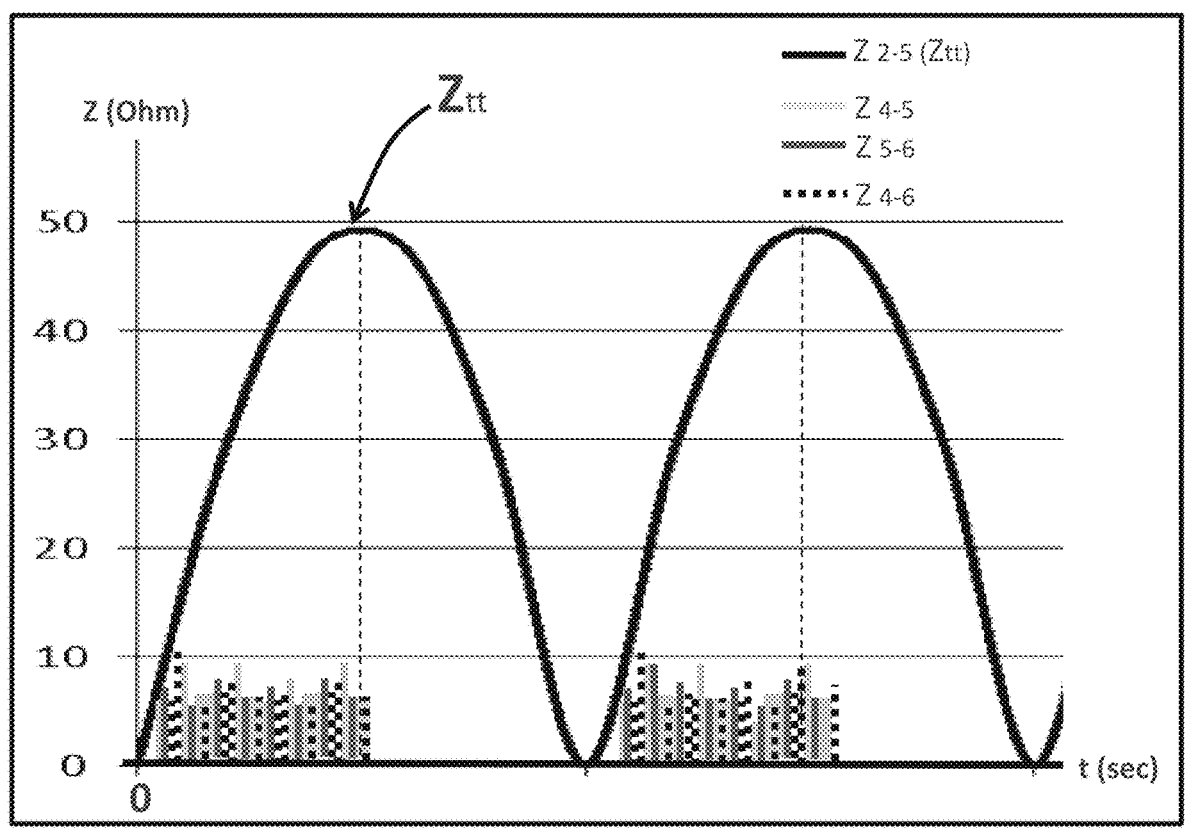

FIGS. 7A and 7B show a similar technic for rapid switching between electrical circuits in each group that is powered by the same generator, where the impedances of the electrical circuits of the respective group are in a non-cyclic order.

FIGS. 7A and 7B schematically illustrate using rapid yet non-cyclic order of electrical circuits acquisition timing for two groups of electrical circuits: first group E1-E2, E2-E3 and E1-E3 powered by G2 requiring rapid switching between the circuits and group E4-E5, E5-E6 and E4-E6 powered by G3 requiring rapid switching between the circuits, which the transthoracic impedance $Z_{tt}$ is continuously measured. In this example, a 10 msec acquisition period span is also used. It is shown how this unordered switching between electrical circuits, for each group, prevents from the coordinated impedance acquired, to be of the same circuit (with the selected point over the time axis that corresponds to a selected point of the transthoracic impedance value (e.g. maximum)). In this example, in FIG. 7A shows the transthoracic impedance $Z_{tt}$ measured with the first group of circuits: E1-E2, E2-E3 and E1-E3. In this case, since there is no cyclic order to the circuits switching, the coordinated impedances located at points over the time axis that correspond to selected peaks (maximum points) of the transthoracic impedance $Z_{tt}$ are associated with different electrical circuits: the first being associated with E1-E2 and the second being associated with E2-E3. In the same way, as shown in FIG. 7B, the transthoracic impedance $Z_{tt}$ measured with the second group of circuits: E4-E5, E5-E6 and E4-E6. In this case, since there is no cyclic order to the circuits switching, the coordinated impedances located at points over the time axis that correspond to selected peaks (maximum points) of the transthoracic impedance $Z_{tt}$ are associated with different electrical circuits: the first being associated with E4-E5 and the second being associated with E4-E6.

EXAMPLES

Example 1 is a system for determining lung impedance of a subject, the system comprising at least:
multiple electrical circuits, positioned and configured for acquiring multiple impedance measurements from different areas of a thorax of a subject, each electrical circuit using a pair of electrodes, wherein one of the multiple electrical circuits serves as a main electrical circuit;
at least two generators comprising at least: a first generator used for powering the main electrical circuit; and one or more additional generators, each additional generator being used for powering at least one other electrical circuit, other than the main electrical circuit;
one or more sensors, located and configured to enable separate measuring of impedance of each of the multiple electrical circuits; and
a central control and processing unit (CCPU) configured at least to:
(i) select at least one timing-position using a timer module that uses measurements from the main electrical circuit powered by the first generator;
(ii) select impedance measurements of one or more of the multiple electrical circuits that have been acquired at the selected at least one timing-position; and
(iii) determine a lung impedance of the subject, based on all selected impedance measurements acquired at the selected at least one timing-position.

In example 2, the subject matter of example 1 may include, wherein the CCPU is further configured to determine breathing cycle impedance behavior and select a breathing state for selecting the at least one timing-position over the breathing cycle of the subject, using the impedance measurements from the main electrical circuit, wherein the at least one time position represents a specific breathing state of the subject, such that all selected impedance measurements have been or are acquired at the same breathing state of the subject.

In example 3, the subject matter of any one or more of examples 1 to 2 may include, wherein the timer module is configured to register acquisition-time-span $ATSi_i$ of each electrical circuit "i" of the multiple electrical circuits, such that each value of the measured impedance, of the respective electrical circuit, is associated with a different time-value over the acquisition-time-span $ATS_i$ of the respective electrical circuit for selecting impedance measurements from all electrical circuits that have been acquired at the same selected at least one timing-position.

In example 4, the subject matter of any one or more of examples 1 to 3, wherein the main electrical circuit is operated in a continuous manner, to enable to enable selection of several time positions, all representing the same breathing state of the subject.

In example 5, the subject matter of any one or more of examples 1 to 4 may include, wherein the impedance measurements of each of the electrical circuits are determined by the CCPU, based on output data or signals outputted from the one or more sensors. In example 6, the subject matter of any one or more of examples 1 to 5 may include, wherein the main electrical circuit uses two electrodes, a front main electrode positioned over a frontal side of the subject's thorax and a back main electrode, positioned at a back side of the subject's thorax.

In example 7, the subject matter of any one or more of examples 1 to 6 may include, wherein the system comprises:
six electrodes: three electrodes E1, E2 and E3 attached to the front side of the subject's thorax and three back electrodes E4, E5 and E6 attached to the back side of the subject's thorax;
three generators: a first generator $G_1$ powering the main electrical circuit E2-E5 and outputting AC power of a first frequency $f_1$, a second generator $G_2$, powering front electrical circuits: E1-E2, E2-E3 and E1-E3 in a switchable manner controllable via the CCPU, $G_2$ outputting AC power at a second frequency $f_2$, which is different than the first frequency $f_1$, and a third generator $G_3$, powering back electrical circuits: E4-E5, E5-E6 and E4-E6 in a switchable manner controllable via the CCPU, $G_3$ outputting AC power at a third frequency $f_3$, which is different than the first frequency $f_1$,
wherein the CCPU controls switching between the electrical circuits E1-E2, E2-E3 and E1-E3 of the front electrodes, via $G_2$ and switching between the electrical circuits E4-E5, E5-E6 and E4-E6 of the back electrodes, via $G_3$, while associating timing-position of each acquired value of the transthoracic impedance $T_{tt}$ measured continuously by the main electrical circuit, in respect to timing-positions of impedances measured for each of the other electrical circuits within each of their respective acquisition-time-span.

In example 8, the subject matter of any one or more of examples 1 to 7 may include, wherein each of the one or more sensors is connected to a different electrical circuit, and is configured to measure a parameter associated with impedance of the electrical circuit to which it connects.

In example 9, the subject matter of any one or more of examples 1 to 8 may include, wherein each of the one or more sensors is configured to measure voltage/potential and/or current of the electrical circuit to which it connects.

In example 10, the subject matter of any one or more of examples 1 to 9 may include, wherein the system further comprises one or more detectors for detecting one or more characteristics associated with breathing of the subject.

In example 11, the subject matter of any one or more of examples 1 to 10 may include, wherein the one or more detectors comprise one or more of: one or more piezoelectric transducers, one or more mechanical sensors.

In example 12, the subject matter of any one or more of examples 1 to 11 may include, wherein the one or more additional generators comprise at least two additional generators, each additional generator switchably connectable to two different electrical circuits, wherein the main electrical circuit is simultaneously operated, at each acquisition session, with two other electrical circuits.

Example 13 is a method for determining lung impedance of a subject, the method comprising at least:
providing: a first generator and a main electrical circuit powered by the first generator, and one or more additional generators each additional generator powering one or more additional electrical circuits, each electrical circuit using a pair of electrodes and is positioned and configured to measure impedance at a different area of a thorax of a subject;
selecting at least one timing-position using a timer module that uses measurements from the main electrical circuit powered by the first generator;
selecting impedance measurements of one or more of the multiple electrical circuits that have been acquired at the selected at least one timing-position; and
determine a lung impedance of the subject, based on all selected impedance measurements acquired at the selected at least one timing-position.

In example 14, the subject matter of example 13 may include, wherein the main electrical circuit is positioned and configured to measure a thoracic impedance of the subject.

In example 15, the subject matter example 14 may include, wherein the one or more additional generators comprise two additional generators, each additional generator being connectable to two different electrical circuits, wherein the main electrical circuit is simultaneously operated, at each acquisition session, with two other electrical circuits each powered by a different additional generator.

In example 16, the subject matter of any one or more of examples 13 to 15 may include, wherein the method further comprises:
determining a breathing cycle related impedance behavior of the subject, using impedance measurements from the main electrical circuit; and
selecting a specific breathing state and its corresponding impedance behavior, based on the impedance measurements from the main electrical circuit, wherein the selection of the at least one timing-position is done by selecting at least one timing-position that corresponds to the same selected breathing state of the subject and its corresponding impedance behavior.

In example 17, the subject matter of any one or more of examples 13 to 16 may include, wherein the method further comprises:
registering acquisition-time-span $ATSi_i$ of each electrical circuit "i" of the multiple electrical circuits, such that each value of the measured impedance, of the respective electrical circuit, is associated with a different time-value over the acquisition-time-span $ATS_i$ of the respective electrical circuit for selecting impedance measurements from all electrical circuits that have been acquired at the same selected at least one timing-position.

In example 18, the subject matter of any one or more of examples 13 to 17 may include, wherein the main electrical circuit is operated in a continuous manner, to enable selection of several time positions, all representing the same breathing state of the subject.

In example 19, the subject matter of any one or more of examples 13 to 18 may include, wherein the impedance measurements of each of the electrical circuits are determined by the CCPU, based on output data or signals outputted from the one or more sensors.

Although the above description discloses a limited number of exemplary embodiments of the invention, these embodiments should not apply any limitation to the scope of the invention, but rather be considered as exemplifications of some of the manners in which the invention can be implemented.

The method and/or processes described herein may be implemented by any one or more software, and/or hardware, element, apparatus, device, mechanism, electronic and/or digital computerized setup, unit, processing module, device, machine, engine, etc.

The system, module, unit, device etc. or parts thereof, may be programmed to perform particular functions such as computer readable, controllable and/or executable instructions, rules, conditions, switching, etc. from programmable hardware and/or software based execution modules that may implement one or more methods or processes disclosed herein, and therefore can, in effect, be considered as disclosing a "special purpose computer" particular to embodiments of each disclosed method/process.

It is important to note that the methods/processes and/or systems/devices/subsystems/apparatuses/modules, units, models, etc., disclosed in the above Specification, are not to be limited strictly to flowcharts and/or diagrams provided in the Drawings. For example, a method may include additional or fewer processes or steps in comparison to what is described in the figures. In addition, embodiments of the method are not necessarily limited to the chronological and/or numbering order as illustrated and described herein.

It is noted that terms such as "processing", "computing", "calculating", "determining", "establishing", "analyzing", "checking", "estimating", "deriving", "assessing", "selecting", "detecting" and/or the like, may refer to operation(s) and/or electronic and/or digital computing device(s) and/or electric circuitry, that manipulate and/or transform data, electric signals etc., represented as physical (e.g., electronic or optical signal) quantities.

Terms used in the singular shall also include a plural scope, except where expressly otherwise stated or where the context otherwise requires.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Unless otherwise stated, the use of the expression "and/or" between the last two members of a list of options for selection indicates that a selection of one or more of the listed options is appropriate and may be made i.e. enabling all possible combinations of one or more of the specified options. Further, the use of the expression "and/or" may be used interchangeably with the expressions "at least one of the following", "any one of the following" or "one or more of the following", followed by a listing of the various options.

It is appreciated that certain features of the invention, which are, for clarity, described in the context of separate embodiments or example, may also be provided in combination in a single embodiment. Conversely, various features of the invention, which are, for brevity, described in the context of a single embodiment, example and/or option, may also be provided separately or in any suitable sub-combination or as suitable in any other described embodiment, example or option of the invention. Certain features described in the context of various embodiments, examples and/or optional implementations are not to be considered essential features of those embodiments, unless the embodiment, example and/or optional implementation is inoperative without those elements.

It is noted that the terms "in some embodiments", "according to some embodiments", "according to some embodiments of the invention", "for example", "e.g.", "for instance" and "optionally" may herein be used interchangeably.

The number of elements shown in the Figures should not be construed as limiting and is for illustrative purposes only.

The invention claimed is:

1. A system for determining lung impedance of a subject, the system comprising at least:
   multiple electrical circuits, configured to be positioned for acquiring multiple impedance measurements from different areas of a thorax of the subject, each electrical circuit using a pair of electrodes, wherein the pairs of electrodes are selected from six electrodes: three electrodes E1, E2 and E3 for attachment to a front side of the subject's thorax and three back electrodes E4, E5 and E6 for attachment to a back side of the subject's thorax, wherein one of the multiple electrical circuits is a main electrical circuit of the electrodes E2-E5;
   at least three generators comprising: a first generator $G_1$ for powering the main electrical circuit, outputting AC power of a first frequency $f_1$; and one or at least two more additional generators, each additional generator for powering at least one electrical circuit of the multiple electrical circuits other than the main electrical circuit, comprising at least a second generator $G_2$, powering the front electrical circuits: E1-E2, E2-E3 and E1-E3 in a switchable manner, $G_2$ outputting AC power at a second frequency $f_2$, which is different than the first frequency $f_1$, and a third generator $G_3$, powering the back electrical circuits: E4-E5, E5-E6 and E4-E6 in a switchable manner, $G_3$ outputting AC power at a third frequency $f_3$, which is different than the first frequency $f_1$;
   one or more sensors, located and configured to enable separate measuring of impedance of each of the multiple electrical circuits; and
   a central control and processing unit (CCPU) configured at least to:
      (i) control switching between the electrical circuits E1-E2, E2-E3 and E1-E3 of the front electrodes, via $G_2$, and between the electrical circuits E4-E5, E5-E6 and E4-E6 of the back electrodes, via $G_3$, while associating a timing position of each acquired value of the transthoracic impedance measured continuously for the main electrical circuit E2-E5, with respect to timing positions of impedances measured for each of the other electrical circuits within each of their respective acquisition-time-spans ATSi;
      (ii) select at least one timing position using a timer module that uses impedance measurements from the main electrical circuit powered by the first generator;
      (iii) select impedance measurements of one or more of the multiple electrical circuits that have been acquired at the selected at least one timing position; and
      (iv) determine a lung impedance of the subject, based on all selected impedance measurements acquired at the selected at least one timing position.

2. The system of claim 1, wherein the CCPU is further configured to determine breathing cycle impedance behavior and to select a breathing state wherein the selected at least one timing position over the breathing cycle of the subject is selected using the impedance measurements from the main electrical circuit to correspond with the selected breathing state of the subject, such that all selected impedance measurements are acquired at the selected breathing state of the subject.

3. The system of claim 1, wherein the timer module is configured to register the acquisition-time-span ATSi of each electrical circuit "i" of the multiple electrical circuits, such that each value of the measured impedance, of the respective electrical circuit, is associated with a different time value over the acquisition-time-span ATSi of the respective electrical circuit for selecting impedance measurements from all electrical circuits that have been acquired at the same selected at least one timing position.

4. The system of claim 1, wherein the main electrical circuit is operated in a continuous manner, to enable selection of several timing positions over multiple breathing cycles, all representing the same breathing state of the subject.

5. The system of claim 1, wherein the impedance measurements of each of the electrical circuits are determined by the CCPU, based on output data or signals outputted from the one or more sensors.

6. The system of claim 1, wherein each of the one or more sensors is connected to a different electrical circuit, and is configured to measure a parameter associated with impedance of the electrical circuit to which it connects.

7. The system of claim 6, wherein each of the one or more sensors is configured to measure voltage/potential and/or current of the electrical circuit to which it connects.

8. The system of claim 1 further comprising one or more detectors for detecting one or more characteristics associated with breathing of the subject.

9. The system of claim 8, wherein the one or more detectors are from a set of detectors including piezoelectric transducers and mechanical sensors.

\* \* \* \* \*